Nov. 4, 1924.
C. Y. DYKE
1,514,446
WINDSHIELD WIPER
Filed March 29, 1924
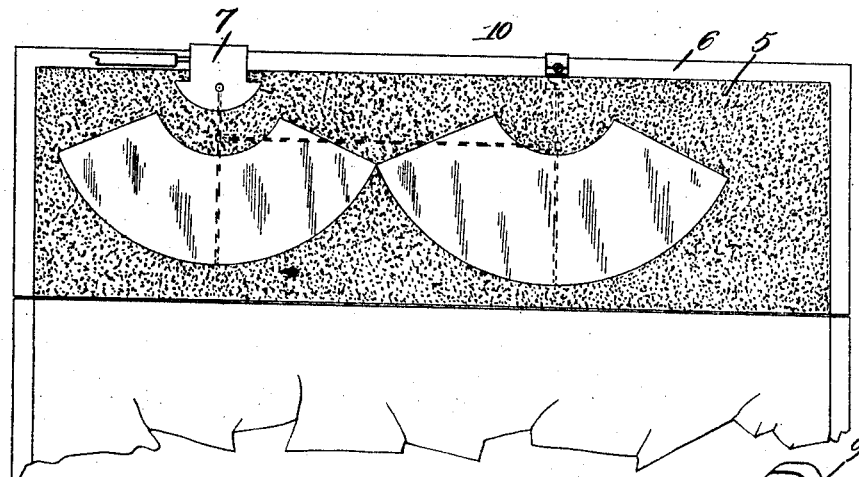
Fig. 1.
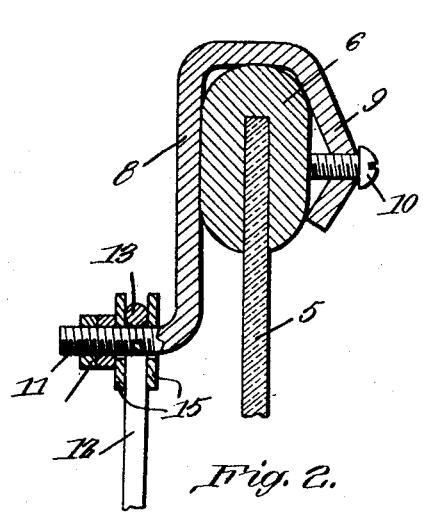
Fig. 2.
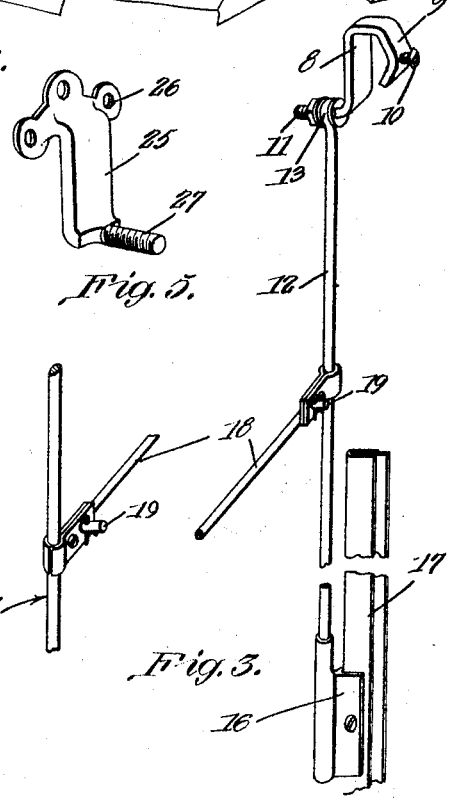
Fig. 5.
Fig. 3.
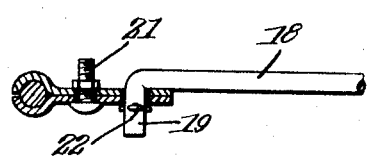
Fig. 4.
C. Y. Dyke, Inventor Patented Nov. 4, 1924.

1,514,446

UNITED STATES PATENT OFFICE.

CECIL YALE DYKE, OF ONTARIO, CALIFORNIA.

WINDSHIELD WIPER.

Application filed March 29, 1924. Serial No. 702,918.

*To all whom it may concern:*

Be it known that I, CECIL YALE DYKE, a citizen of the United States, residing at Ontario, in the county of San Bernardino and State of California, have invented a new and useful Windshield Wiper, of which the following is a specification.

This invention has reference to windshield wipers and aims to provide a novel form of windshield wiper which may be employed in connection with the usual windshield wiper and operated simultaneously therewith, thereby providing means to increase the size of the space cleaned with a single operation.

An important object of the invention is to provide a device of this character that may be readily and easily positioned on the usual windshield frame eliminating the necessity of making alterations in the windshield construction to apply the same.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a fragmental elevational view of a windshield disclosing a wiper constructed in accordance with the present invention.

Figure 2 is a fragmental sectional view taken on line 2—2 of Figure 1.

Figure 3 is a perspective view disclosing the windshield wiper forming the essence of the invention.

Figure 4 is a sectional view disclosing the manner of connecting the wiper forming the essence of this invention to the usual windshield wiper.

Figure 5 is a modified form of bracket member employed in connection with closed vehicles.

Referring to the drawing in detail, the reference character 5 designates a windshield which is provided with the usual windshield frame indicated at 6.

The windshield wiper indicated at 7 is of a well known construction and is employed for cleaning windshields, now in common use.

The auxiliary wiper used in connection with the wiper 7 and which constitutes the essence of the present invention includes a bracket member 8 which is bent as at 9 to fit over the upper edge of the windshield frame of a motor vehicle, there being provided a set screw 10 extending through a suitable threaded opening in the bracket and adapted to engage the windshield frame to set up a binding action between the bracket and frame to secure the bracket to the frame.

A right angled arm 11 forms a part of the bracket and affords a bearing for the arm 12 which is provided with an eye 13 fitted over the bearing 11, the arm being held in position by means of the nuts 14 and washers 15 mounted on the bearing 11.

This arm 12 is positioned in such a way that it will normally hang downwardly, the lower end thereof carrying the securing means 16 by which the wiper 17 is secured to the arm 12. In order that the auxiliary wiper may be moved simultaneously with the operation of the main wiper 7, a connecting rod 18 is provided, which connecting rod is formed with right angled extremities 19 adapted to be fitted in suitable openings of the clamping members 20 that embrace portions of the arm 12, and corresponding arm of the adjacent windshield wiper.

Each of these clamping members includes a pair of arms having curved portions adapted to embrace portions of the wiper arms, the sections being held into close engagement with each other by means of the bolts 21.

The right angled ends of the connecting rod 18 are formed with openings to receive the cotter pins 22 which hold the connecting rod 18 in position on the clamping members.

From the foregoing it will be obvious that by positioning an auxiliary wiper on the windshield and connecting the wiper with the supporting arm of the usual windshield wiper now in common use, both wipers will be operated simultaneously to the end that the space cleared by the wipers will be greatly increased.

In the modified form of the invention as illustrated by Figure 5 of the drawing, the bracket member which is indicated by the reference character 25 is especially designed for securing to closed cars, the bracket being provided with openings 26 to receive suitable securing screws.

A right angled portion 27 is fitted in the eye formed at the upper end of the arm 12 to pivotally support the arm 12 and permit operation thereof in a manner as described.

I claim:—

A windshield wiper including an inverted U-shaped saddle having an offset portion formed with a threaded opening, a set screw extending through the offset portion of the saddle to secure the saddle to a windshield frame, said saddle having a vertically disposed arm terminating in a right angled extension providing a bearing, a wiper arm having an eye in its upper end adapted to fit over the bearing, and means for securing the wiper arm to the bearing to permit the wiper arm to move thereon.

In testimony that I claim the foregoing as my own, I have hereto affixed my signature in the presence of two witnesses.

CECIL YALE DYKE.

Witnesses:
ALLA M. McCREA,
ROY E. STRICKLING.